United States Patent Office 2,836,511
Patented May 27, 1958

2,836,511

COLLOIDAL SYSTEMS OF CYANOETHYLATED STARCH AND THEIR USE

Thomas E. Sample, Jr., La Marque, Tex., assignor to Monsanto Chemical Company, St. Louis, Mo., a corporation of Delaware No Drawing. Application October 17, 1956
Serial No. 616,385

19 Claims. (Cl. 117—65)

This invention relates to colloidal systems of cyanoethylated starch, water, and acetonitrile and to the use of such systems for impregnating cellulosic materials.

Starch-water mixtures are commonly used as impregnants for cellulosic materials such as cloth and paper. The resultant starch-coated cellulosic material is susceptible to attack by microorganisms, water and other solvents. To eliminate this deficiency, it is common practice to further treat such starch-impregnated cellulosic materials with another impregnant for the purpose of decreasing the susceptibility of the cellulosic product to deterioration due to the attack of water, other solvents, and microorganisms. This double impregnation technique is obviously costly.

The cyanoethyl ethers of starch are well known in the art. Those containing a degree of substitution of from 1.5 to 2.0, that is, from about 1.5 to 2.0 cyanoethyl ether groups per glucose unit, are extremely resistant to attack by microorganisms, water and other solvents. Due to the insolubility of such cyanoethyl ethers of starch in water and common organic solvents, it has not been possible to satisfactorily impregnate cellulosic materials with these cyanoethyl ethers of starch according to methods heretofore used.

It is an object of this invention to provide improved colloidal sols of cyanoethyl ethers of starch. It is a further object to provide cellulosic materials impregnated with cyanoethyl ethers of starch and a process for producing such impregnated cellulosic materials. Other objects will become apparent from a description of the invention.

It has now been discovered that, while cyanoethyl ethers of starch containing from 1.5 to 2.0 cyanoethyl ether groups per glucose unit cannot be colloidally dispersed in water per se or in acetonitrile per se, a colloidal sol of such starch ethers can be prepared using a mixture of water and acetonitrile. Specifically, a colloidal sol has been discovered comprising a colloidal dispersion of a cyanoethyl ether of starch containing from about 1.5 to about 2.0 cyanoethyl ether groups per glucose unit in a mixture of water and acetonitrile, said mixture containing an amount of water dependent upon the number of cyanoethyl ether groups per glucose unit. The minimum amount of water present lies in the range from about 2% by weight of the water-acetonitrile mixture for a starch containing about 2.0 cyanoethyl ether groups per glucose unit to about 12% by weight of the solvent mixture for a starch containing about 1.5 cyanoethyl ether groups per glucose unit. The maximum amount of water lies in the range from about 48% by weight of the water-acetonitrile mixture for a starch containing about 2.0 cyanoethyl ether groups per glucose unit to about 54% by weight of the said mixture for a starch containing about 1.5 cyanoethyl ether groups per glucose unit.

The unusual nature of the colloidal sols of this invention was established by a series of very simple tests. Colloidal sols of cyanoethylated starch having various degrees of substitution were prepared in water-acetonitrile mixtures containing from about 5% to about 30% water. The concentration of the cyanoethylated starch in such samples was about 7%. Duplicate samples were then titrated with water to establish the maximum concentration of water in the mixture at which irreversible precipitation occurred. Similar duplicate samples were then titrated with acetonitrile to establish the minimum concentration of water in the mixture at which irreversible precipitation occurred. Results are indicated in the following table.

*Extreme limits of stability of the colloidal system Cyanoethylated starch-water-acetonitrile*

| Cyanoethyl Ether Groups Per Glucose Unit (D. S.) | Range of Weight Percent Water Based on Water-Acetonitrile Mixture Within Which Stable Colloidal Sols Exist |
| --- | --- |
| 1.95 | 2.0% min. to 48% max. |
| 1.78 | 3.5% min. to 52% max. |
| 1.51 | 12% min. to 54% max. |

A mixture of water and acetonitrile below the minimum or above the maximum specified in the table cannot be used to prepare a colloidal sol of a cyanoethyl ether of starch of the degree of substitution (D. S.) indicated.

From the standpoint of this invention, the critical factor in all of these systems is the ratio of water to acetonitrile and not the concentration of the cyanoethylated starch. The results indicate that as the number of cyanoethyl ether groups per glucose unit varies, the amount of water necessary in the water-acetonitrile mixture to prepare stable colloidal sols also varies. As the degree of substitution increases, both the minimum and the maximum tolerable limits of water in the water-acetonitrile mixture decrease. Within the limits of this invention, the mixture of acetonitrile and water used to prepare colloidal sols of cyanoethylated starch having a degree of substitution of about 2.0 must contain water varying from a minimum amount of 2% by weight of the mixture to a maximum amount of about 48% by weight of the mixture. A mixture of acetonitrile and water used to prepare a colloidal sol of a cyanoethyl ether of starch containing about 1.5 cyanoethyl ether groups per glucose unit must contain water in a minimum amount of about 12% by weight of the mixture to a maximum amount of about 54% by weight of the mixture.

The colloidal dispersions of this invention are easily prepared. The dry cyanoethyl ether of starch is merely mechanically dispersed by means, for example, of a Waring Blendor, a conventional shaker, or like means, in the mixture of water and acetonitrile. Particle size of the cyanoethylated starch is not critical but the finer the mesh the more easily and quickly is the dry material dispersed in the liquid. Dry cyanoethylated starch ground to a size between 20 and 60 mesh is usually satisfactory, but material having an average particle size of around 40 mesh is preferred. The substituted starch need not be dried for that matter. Equally suitable for use is the "dough" from the cyanoethylation reaction. This can be cut into small pieces and added to the acetonitrile-water mixture in a suitable mixing vessel such as a rotary electric churn, for example, and beaten. When the dough is used, allowance is made, of course, for its occluded water content and the proportions of water and acetonitrile in the water-acetonitrile mixture are adjusted accordingly. While the foregoing results were obtained using a cyanoethyl ether of corn starch, cyanoethyl ethers of sago, tapioca, potato, wheat or rice starches can also be used.

The colloidal sols of this invention can be used to impregnate cellulosic materials, rendering them less susceptible to deterioration due to attack by water, other solvents, and microorganisms. In accordance with this invention, improved cellulosic products are obtained by impregnating the cellulosic material with the colloidal sols of the invention, drying the impregnated cellulosic material, and then calendering the cellulosic material. Cellulosic materials that can be impregnated by the process of this invention include paper and fabrics, particularly woven cotton fabrics suitable for use as tracing cloth, holland cloth and the like. The following examples illustrate this process:

EXAMPLE I

A colloidal sol is prepared containing approximately 10% by weight of a cyanoethyl ether of starch having a degree of substitution of 1.95 in a mixture of water and acetonitrile containing 10% by weight of water. This colloidal sol is knife-coated onto thin stock paper and the impregnated paper is dried at 110° F. The impregnated paper is then calendered by pressing with a hot iron at about 310° F. The surface of the paper thus obtained is highly glazed. The paper is flexible and highly resistant to attack by water, other organic solvents, and microorganisms.

EXAMPLE II

The procedure set forth in Example I is repeated using a cyanoethyl ether of starch having a degree of substitution of 1.78. Comparable results are obtained.

EXAMPLE III

The procedure set forth in Example I is repeated using a colloidal sol composed of a 10% by weight colloidal dispersion of a cyanoethyl ether of starch having a degree of substitution of 1.51 in a mixture of water and acetonitrile containing 20% by weight of water. Comparable results are obtained.

EXAMPLE IV

A colloidal sol is prepared containing approximately 10% by weight of a cyanoethyl ether of starch having a degree of substitution of 1.95 in a mixture of water and acetonitrile containing 10% by weight of water. A bleached cotton fabric weighing 1.9 ounces per square yard and having 85 warp ends and 87 filling yarns per inch is impregnated by immersion in this colloidal sol. The impregnated fabric is dried at about 100° F. for about 20 minutes. The impregnated fabric is then given two passes through a three-roll friction calender maintained at a temperature of about 320° F. The calendered fabric has exceptional utility as tracing cloth. The surface of the fabric is smooth and highly glazed, possesses a high dimensional stability, and is extremely resistant to water, organic solvents, and microorganisms.

EXAMPLE V

The procedure set forth in Example IV is repeated using a cyanoethyl ether of starch having a degree of substitution of 1.78. Comparable results are obtained.

EXAMPLE VI

The procedure set forth in Example IV is repeated using a colloidal sol composed of a 10% by weight colloidal dispersion of a cyanoethyl ether of starch having a degree of substitution of 1.51 in a mixture of water and acetonitrile containing 20% by weight of water. Comparable results are obtained.

The colloidal sols of this invention can be applied to cellulosic materials in any of various ways well known to those skilled in the art. Knife-coating, roll-coating or immersion of the cellulosic material in the sol are all suitable methods of treatment. Repeated immersions with drying between immersions are particularly useful.

The quantity of the cyanoethyl ether of starch in the colloidal sol used to treat cellulosic materials in accordance with this invention can be substantially varied. In general, from about 5% to about 30% by weight of the cyanoethyl ether of starch based on total composition of the sol is used. Higher or lower concentrations can be used in particular applications if desired. If desired, plasticizers may be added to the colloidal sol to alter the flexibility characteristics of the finished impregnated product.

Various conditions of drying and calendering of the impregnated cellulosic material can be used. For example, the impregnated cellulosic material, such as cloth, may be dried at any temperature which drives off the solvent contained in the impregnating dispersion, but it is preferably dried at temperatures which allow the solvent to be released at such a rate that formation of blisters or bubbles on the treated surface is avoided. If speed of drying is unimportant, the impregnated cellulosic material can be dried at normal room temperatures. The impregnated material can be dried satisfactorily, for example, at temperatures varying between 90° F. to 120° F.

Calendering may be carried out by using other means and conditions than those described above. Hand ironing and friction calendering are particularly suitable. In general, the impregnated material is super-calendered at temperatures and pressures which will cause the impregnant to soften or flow into a substantially continuous film or surface. Suitable temperatures for super-calendering vary between about 275° F. to about 330° F. Other temperatures can be used when different effects are desired.

What is claimed is:

1. A composition comprising a colloidal dispersion of a cyanoethyl ether of starch containing from about 1.5 to about 2 cyanoethyl ether groups per glucose unit in a mixture of water and acetonitrile, water being present in a minimum amount in the range from about 2% by weight of said water-acetonitrile mixture for a starch containing about 2.0 cyanoethyl ether groups per glucose unit to a minimum amount of about 12% by weight of said mixture for a starch containing about 1.5 cyanoethyl ether groups per glucose unit and in a maximum amount in the range from about 48% by weight of said water-acetonitrile mixture for a starch containing 2.0 cyanoethyl ether groups per glucose unit to a maximum amount of about 54% by weight of said mixture for a starch containing about 1.5 cyanoethyl groups per glucose unit.

2. A composition comprising a colloidal dispersion of a cyanoethyl ether of starch containing about 2.0 cyanoethyl ether groups per glucose unit in a mixture of water and acetonitrile said mixture containing water in an amount in the range from about 2% to about 48% by weight of said mixture.

3. A composition comprising a colloidal dispersion of a cyanoethyl ether of starch containing about 1.8 cyanoethyl ether groups per glucose unit in a mixture of water and acetonitrile said mixture containing water in an amount from about 3.5% to about 52% by weight of said mixture.

4. A composition comprising a colloidal dispersion of a cyanoethyl ether of starch containing about 1.5 cyanoethyl ether groups per glucose unit in a mixture of water and acetonitrile, said mixture containing water in an amount from about 12% to about 54% by weight of said mixture.

5. A process for the preparation of improved cellulosic materials which comprises impregnating a cellulosic material with a colloidal dispersion as defined in claim 1, drying said impregnated cellulosic material, and then calendering said cellulosic material.

6. A process for the preparation of improved cellulosic fabrics which comprises impregnating a cellulosic fabric with a colloidal dispersion as defined in claim 1, drying said impregnated cellulosic fabric, and then calendering said cellulosic fabric.

7. A process for the preparation of improved cotton fabrics which comprises impregnating a cotton fabric with a colloidal dispersion as defined in claim 1, drying said impregnated cotton fabric, and then calendering said cotton fabric.

8. A process for treating paper which comprises impregnating said paper with a colloidal dispersion as defined in claim 1, drying said impregnated paper, and then calendering said paper.

9. A process for the preparation of improved cellulosic materials which comprises impregnating a cellulosic material with the composition of claim 2, drying said impregnated cellulosic material, and then calendering said cellulosic material.

10. A process for the preparation of improved cellulosic materials which comprises impregnating a cellulosic material with the composition of claim 3, drying said impregnated cellulosic material, and then calendering said cellulosic material.

11. A process for the preparation of improved cellulosic materials which comprises impregnating a cellulosic material with the composition of claim 4, drying said impregnated cellulosic material, and then calendering said cellulosic material.

12. A process for the preparation of improved cellulosic fabrics which comprises impregnating a cellulosic fabric with the colloidal dispersion of claim 2, drying said impregnated cellulosic fabric, and then calendering said cellulosic fabric.

13. A process for the preparation of improved cellulosic fabrics which comprises impregnating a cellulosic fabric with the colloidal dispersion of claim 3, drying said impregnated cellulosic fabric, and then calendering said cellulosic fabric.

14. A process for the preparation of improved cellulosic fabrics which comprises impregnating a cellulosic fabric with the colloidal dispersion of claim 4, drying said impregnated cellulosic fabric, and then calendering said cellulosic fabric.

15. A process for the preparation of improved cotton fabrics which comprises impregnating a cotton fabric with the colloidal dispersion of claim 2, drying said impregnated cotton fabric, and then calendering said cotton fabric.

16. A process for the preparation of improved cotton fabrics which comprises impregnating a cotton fabric with the colloidal dispersion of claim 3, drying said impregnated cotton fabric, and then calendering said cotton fabric.

17. A process for the preparation of improved cotton fabrics which comprises impregnating a cotton fabric with the colloidal dispersion of claim 4, drying said impregnated cotton fabric, and then calendering said cotton fabric.

18. A process for treating paper which comprises impregnating said paper with the colloidal dispersion of claim 2, drying said impregnated paper, and then calendering said paper.

19. A process for treating paper which comprises impregnating said paper with the colloidal dispersion of claim 4, drying said impregnated paper, and then calendering said paper.

References Cited in the file of this patent

UNITED STATES PATENTS

| | | |
|---|---|---|
| 2,316,128 | Bock et al. | Apr. 6, 1943 |
| 2,316,129 | Bock et al. | Apr. 6, 1943 |
| 2,375,847 | Houtz | May 15, 1945 |